United States Patent [19]
Link et al.

[11] Patent Number: 5,775,204
[45] Date of Patent: Jul. 7, 1998

[54] TEA FILTER ASSEMBLY FOR A COFFEE OR TEA MAKER

[75] Inventors: Karl Link, Bad Homburg; Stefan Schamberg, Usingen; Andreas Birk, Bad Homburg; Albrecht Weller, Steinbach; Klaus Amsel, Schmitten, all of Germany

[73] Assignee: Braun Aktiengesellschaft, Germany

[21] Appl. No.: 792,890

[22] Filed: Jan. 31, 1997

Related U.S. Application Data

[63] Continuation of PCT/EP95/02791 Jul. 15, 1995.

[30] Foreign Application Priority Data

Aug. 6, 1994 [DE] Germany .......................... 44 28 013.0

[51] Int. Cl.⁶ .......................... A47J 31/44; A47J 31/14
[52] U.S. Cl. .......................... 99/299; 99/300; 99/323
[58] Field of Search .......................... 99/279, 295, 299, 99/304, 306, 323, 300; 426/433

[56] References Cited

U.S. PATENT DOCUMENTS 5,231,918  8/1993  Grzywna .......................... 99/299 X
5,711,207  1/1998  Wu .......................... 99/304 X Primary Examiner—Reginald L. Alexander
Attorney, Agent, or Firm—Fish & Richardson P.C.

[57] ABSTRACT

The invention is directed to a tea filter assembly (10) adapted to be fitted to a coffee maker (18) in place of a coffee filter in order to be able to make tea with the coffee maker (18). It is known in the art to provide such a tea filter assembly (10) with a first valve (36) for closing an outlet (44) from the tea filter assembly (10) while the tea is steeping. It is a disadvantage in such a type of tea filter assembly (10) that upon termination of the steeping time hot water continues to be discharged from the coffee maker (18), flowing over the tea leaves and extracting bitter principle in the process. To avoid this drawback, provision is made in the invention for a water conduit (14) through which hot water exiting the coffee maker flows straight into a carafe after the steeping time has ended, without coming into contact with tea leaves contained in a tea basket (16). During the steeping time, the water conduit (14) is closed by a second valve (42) which is actuatable jointly with the first valve (36), preferably by raising and lowering the tea basket (16) together with the water conduit (14).

26 Claims, 5 Drawing Sheets

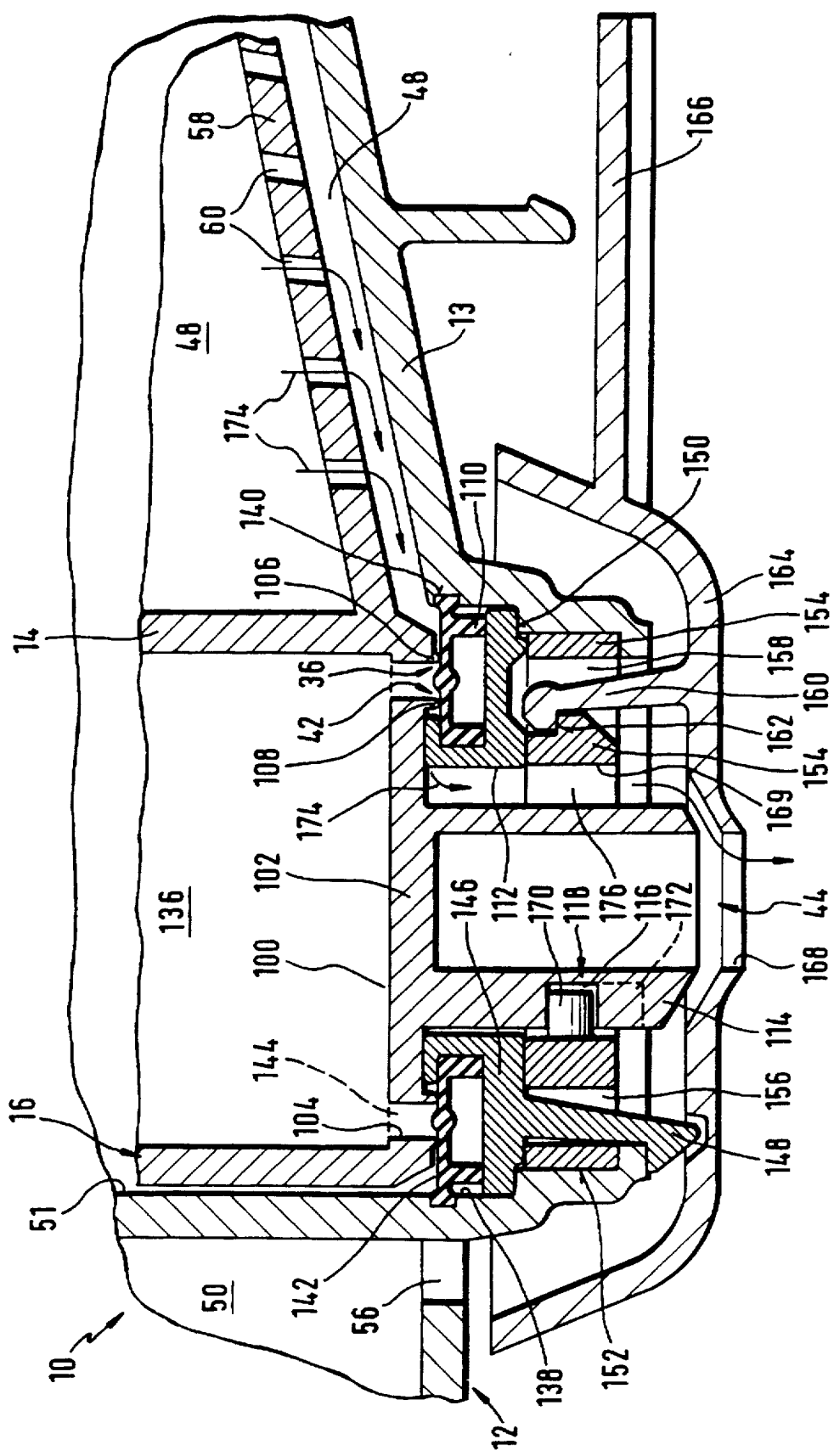

5,775,204

1

TEA FILTER ASSEMBLY FOR A COFFEE OR TEA MAKER

This is a continuation of International Application PCT/EP95/02791, filed Jul. 15, 1995.

BACKGROUND OF THE INVENTION

This invention relates to a tea filter assembly for a coffee or tea maker, having an infusion chamber which is adapted to be loaded with tea leaves or tea bags (tea material) and is supplied with hot water from a discharge port, and having a valve downstream from the infusion chamber for closing the outlet of the brewed beverage flowing out of the infusion chamber.

A tea filter of this type is known from EP 0 327 822 A1. The known tea filter has a filter basket holder adapted to be attached to a coffee maker underneath a discharge port for hot water and above a carafe. A tea basket with a bottom configured as a strainer is inserted in the filter basket holder. The bottom of the filter basket holder is equipped with an outlet opening forming a drain for the tea basket and being adapted to be closed by means of a valve.

To make tea, tea leaves or the like are loaded into the tea basket, and the coffee maker is switched on with the valve closed. Hot water is conducted from the flow-through heater of the coffee maker to the tea filter for steeping, meaning that it draws tea extracts from the tea leaves. At the end of the steeping time, a user opens the valve, and the tea flows through the outlet opening of the filter basket holder into the carafe placed underneath. The bottom of the tea basket, which is configured as a strainer, retains the tea leaves.

A disadvantage of such tea filters when making major amounts of tea is that the steeping time ends before the entire volume of water has entered the tea filter. Hot water continues to be discharged from the coffee maker, flowing over the tea leaves and through the outlet opening of the filter basket holder into the carafe. The steeping time cannot be fixed by this arrangement but depends on the brewing time. This means that hot water continues to come into contact with the tea leaves even upon termination of the steeping time. This should be avoided when making tea because when water and tea leaves are maintained in relative contact for a long time a growing amount of tannin is extracted from the tea leaves, which even in small quantities may impart a bitter taste to the tea.

SUMMARY OF THE INVENTION

It is therefore an object of the present invention to further develop a prior art type tea filter so that the steeping time is completely independent of the amount of tea made, and that the hot water continuing to leave the coffee maker upon termination of the steeping time is prevented from coming into contact with the tea leaves.

Proceeding from a tea filter of the type initially referred to, this object is accomplished by the features of the present invention.

The advantage of the invention is that even for large amounts of tea the user has the option to end the steeping period, that is, the period during which hot water is in contact with the tea leaves in the tea filter, at exactly the desired moment, without any more hot water flowing over the tea leaves. Making tea by means of the tea filter assembly according to the present invention is based on the samovar principle, meaning that a relatively strong decoction is produced which at the end of the steeping time is diluted with hot water to make the tea. A carafe for the tea is preheated on a warming plate of the coffee maker. During the steeping period it is already possible for hot water to bypass the tea basket and enter the carafe, heating it in addition. The tea filter assembly of the invention permits tea to be made with a conventional coffee maker in best quality in any quantity limited only by the capacity of the coffee maker and with any steeping time.

The hot water from the coffee maker may be conducted either to the tea basket for making the decoction or past the tea basket straight into the carafe in order to prevent the hot water from coming into contact with the tea leaves in the tea basket. This may be accomplished, for example, by swiveling a hot water tube of the coffee maker which has a discharge port for the hot water. This hot water tube is adapted to swivel such that the hot water flows either into the tea basket or into a water passageway bypassing the tea basket. This may also be accomplished by adjusting the water passageway so that an inlet opening of the water passageway is positioned either underneath or to the side of the hot water discharge port of the coffee maker.

By virtue of the first embodiment of the invention according to the features of the present invention, a particularly simple tea filter assembly is obtained in which, with the aid of the water conducting device and an inlet that opens into the infusion chamber and is provided at the bottom, it is already possible to predetermine the quantity of hot water that is intended to enter the infusion chamber, hence flowing over the tea leaves. With the valve closed, the extracting water continues to flow through the inlet into the infusion chamber until the valve is opened. Subsequently, the hot water exiting the brewing head of a coffee or tea maker flows only through the water conducting device and the valve directly to a beverage carafe placed underneath the tea filter. Although this first embodiment of the tea filter assembly is very simple, it enables the time and amount of contact between the hot water and the tea to be determined by an operator.

If for major quantities of tea the size of the infusion chamber is inadequate to accommodate the extracting water, it is possible by virtue of the features of the present invention that, with the infusion chamber filled to capacity, the excess tea beverage is discharged through the overflow directly into the beverage carafe.

The features of the present invention advantageously prevent the material to be extracted, such as tea leaves, from entering the beverage collected in the beverage carafe.

The embodiment of the invention has a water conduit for the passage of water. This conduit extends from the hot water discharge port of the coffee maker down to a filler opening of the carafe. The water conduit may be arranged to extend through the tea basket or past the side of it. At the end of the steeping time the water conduit directs hot water from the coffee maker directly into the carafe, stopping the hot water coming into contact with the tea leaves in the tea basket.

According to the features of the present invention, the water conduit is preferably integrally formed with the tea basket. This makes it possible for the tea basket to be manufactured with the water conduit simply in one operation, as by injection molding, for example. The tea basket is insertable together with the water conduit in a filter basket holder which in turn may be fitted to the coffee maker underneath the machine's hot water discharge port superposing the carafe. As filter basket holder it is possible to use the coffee filter basket holder or coffee filter already provided for the coffee maker. It is also possible to use a separate tea filter basket holder which is attached preferably to a holding device on the coffee maker, substituting the coffee filter basket holder. This obviates the necessity of making modifications to the coffee maker.

A second embodiment of the invention has a second valve. With the second valve in closed position, the water passageway is blocked and hot water flows from the coffee maker into the tea basket. With the second valve open, hot water flows from the brewing head of the coffee maker, through the water conducting device past the tea basket directly into the carafe. As extracting water is poured over the tea leaves, it is necessary for the second valve to be closed so that as soon as the water conducting device is filled with extracting water this water exits the water conducting device through its overflow, entering the infusion chamber containing the tea leaves. As soon as the steeping time ends, and extracting water continues to enter the tea filter, both valves are opened, enabling on the one hand the tea beverage to be discharged through the valve arrangement and the outlet into the beverage carafe, while on the other hand enabling the extracting water, which continues to flow into the tea filter, to be discharged directly into the beverage carafe through the water conducting device, bypassing the infusion chamber. Accordingly, the water conducting device is closed by the second valve, while the outflow of the infusion chamber is blocked by the first valve. This second embodiment of a tea filter assembly according to the present invention enables the extracting water to flow into the infusion chamber from above, whereas in the first embodiment of the tea filter assembly this takes place by contrast from the bottom.

In a preferred embodiment of the invention both valves are adapted to be actuated jointly. To allow the tea to steep, both valves are closed so that hot water exiting the coffee maker flows into the tea basket and stays there. At the end of the steeping time both valves are opened jointly, whereby the prepared decoction, that is, the highly aromatic and strong but less bitter tea beverage, flows through the outlet of the tea basket into the carafe. As this occurs, hot water exiting the coffee maker also flows through the water conducting device to the outlet and directly into the carafe, "diluting" the decoction at the outlet to form an agreeably tasting tea beverage. Hence at the end of the steeping time the hot water from the coffee maker no longer comes into contact with the tea leaves in the tea basket. The joint actuation of both valves of the tea filter assembly of the invention simplifies its operation because the making of tea takes only a single manipulation to close both valves—if they were still open beforehand—before switching on the coffee maker, and because only one operating element controlling both valves needs to be actuated, again with just a single manipulation, to end the steeping time.

By virtue of the features of the present invention, only one outlet is needed if the two valves are arranged in succession. The outlet of the tea filter with its valve arrangement thereby becomes particularly simple and affords ease and economy of manufacture if the tea filter is produced as a plastic molded part in an injection mold.

In the second embodiment of the invention the lower end of the water conduit forms a dual valve structure for both valves. This one-piece valve arrangement, which is defined by the water conduit and the bottom of the tea filter, results in a simple and economical configuration of the second embodiment of the valve arrangement. While the first valve prevents the brewed beverage from being drained from the infusion chamber, the second valve prevents hot water from exiting the water conduit. Only when both valves are opened will water flow from both the infusion chamber and the water conducting device to the outlet and then into the beverage carafe.

By virtue of the features of the present invention, it is also possible for this valve arrangement and hence not only for the water conducting device connected to the infusion chamber but also for the housing of the tea filter assembly to be manufactured as separate injection molded parts without the need for any subsequent mechanical processing operations.

A particularly simple, second embodiment of the present invention results from additional features. In this embodiment, the dual valve arrangement is formed by the free end of the water conduit together with the wall of the outlet opening provided at the bottom of the tea filter assembly.

According to the features of the present invention, a particularly simple actuation of both valves results for the second embodiment by arranging a lifting device configured as an eccentric actuating mechanism between the tea basket and the filter basket holder.

A third embodiment of the invention with a dual valve arrangement results from additional features. In this valve arrangement, there is need of only a single seal, which together with the sealing face provided at the free end of the water conduit and on the plug forms the first and the second valve.

To enable simple valve actuation in this instance, provision is made. As the result of an extension of the plug penetrating the outlet downwardly, the valve arrangement of the tea filter can be actuated from underneath, that is, from the outlet side.

The infusion chamber of the tea filter should be small in relation to the volume of conventional coffee filters in order to ensure that even for small quantities of tea the hot water completely envelops the tea leaves in the tea basket while the tea is steeping, and that the infusion chamber fills up with water as quickly as possible. This may be accomplished by separating off the infusion chamber by means of partition walls in the filter basket holder, for example.

The tea filter according to the present invention preferably includes an overflow allowing hot water to run off from the infusion chamber of the tea filter into the carafe when the infusion chamber of the tea filter is already full of hot water during the steeping time and hot water continues to flow from the coffee maker. A quantity of hot water defined by the volume of the infusion chamber extracts active substances from the tea leaves, producing the decoction, while further hot water flows from the coffee maker into the carafe, preheating it. At the end of the steeping time the decoction is drained from the infusion chamber into the carafe where it mixes with the hot water to produce tea.

In a preferred embodiment according to the present invention, an inlet to the overflow is provided with a retention device for the tea leaves. This may be accomplished, for example, by forming the inlet as a strainer having passage holes or as a grill having slots.

An embodiment of the present invention will be described below in greater detail with reference to the accompanying drawings. In the drawings,

BRIEF DESCRIPTION OF THE DRAWINGS

FIG. 5 is a partial longitudinal sectional view of a tea filter assembly illustrating a third embodiment in the area of the dual valve arrangement.

DESCRIPTION OF THE PREFERRED EMBODIMENT

Figure 1:
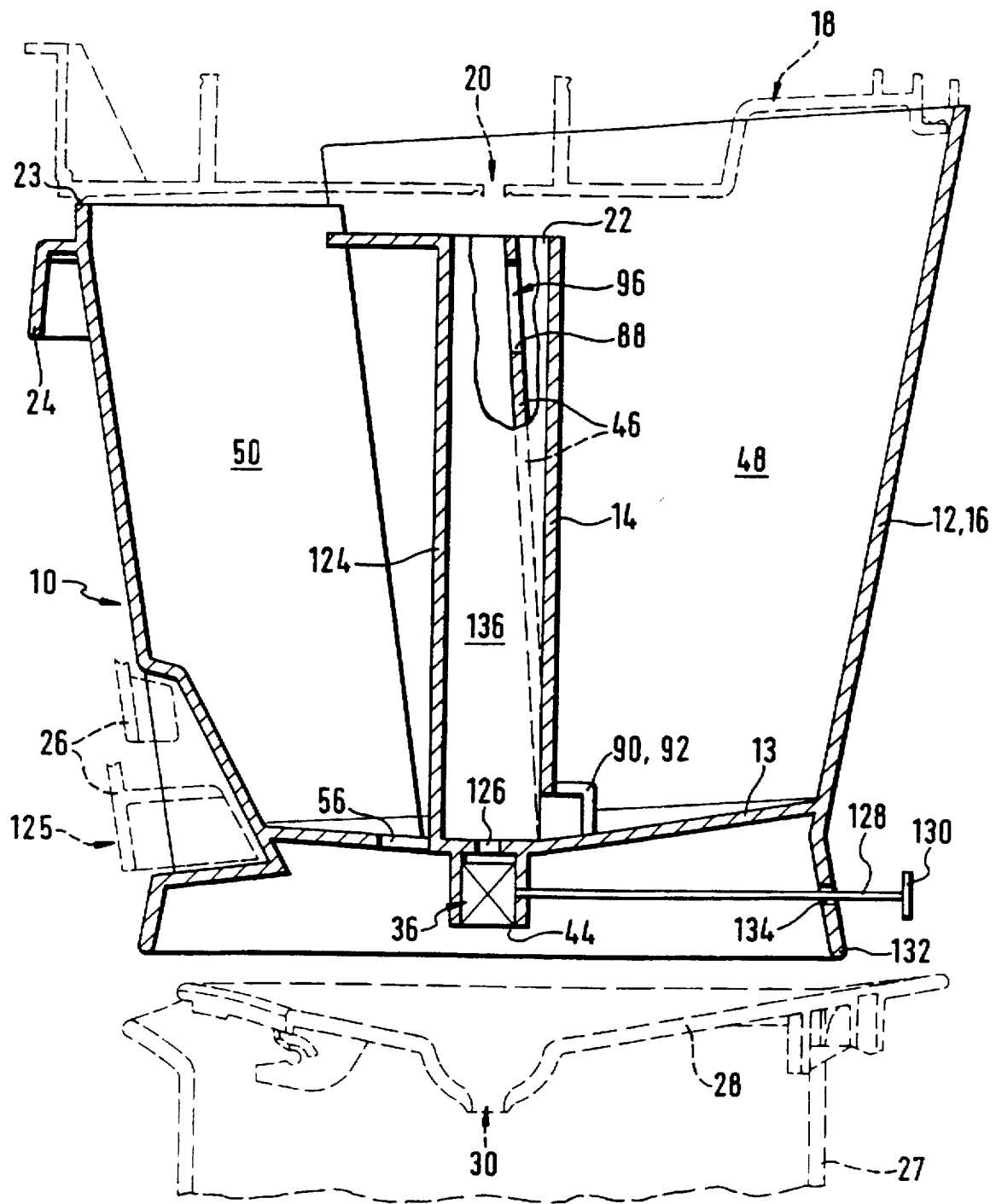
FIG. 1 is a sectional view of a tea filter assembly illustrating a first embodiment of the present invention with only one valve.
Figure 2:
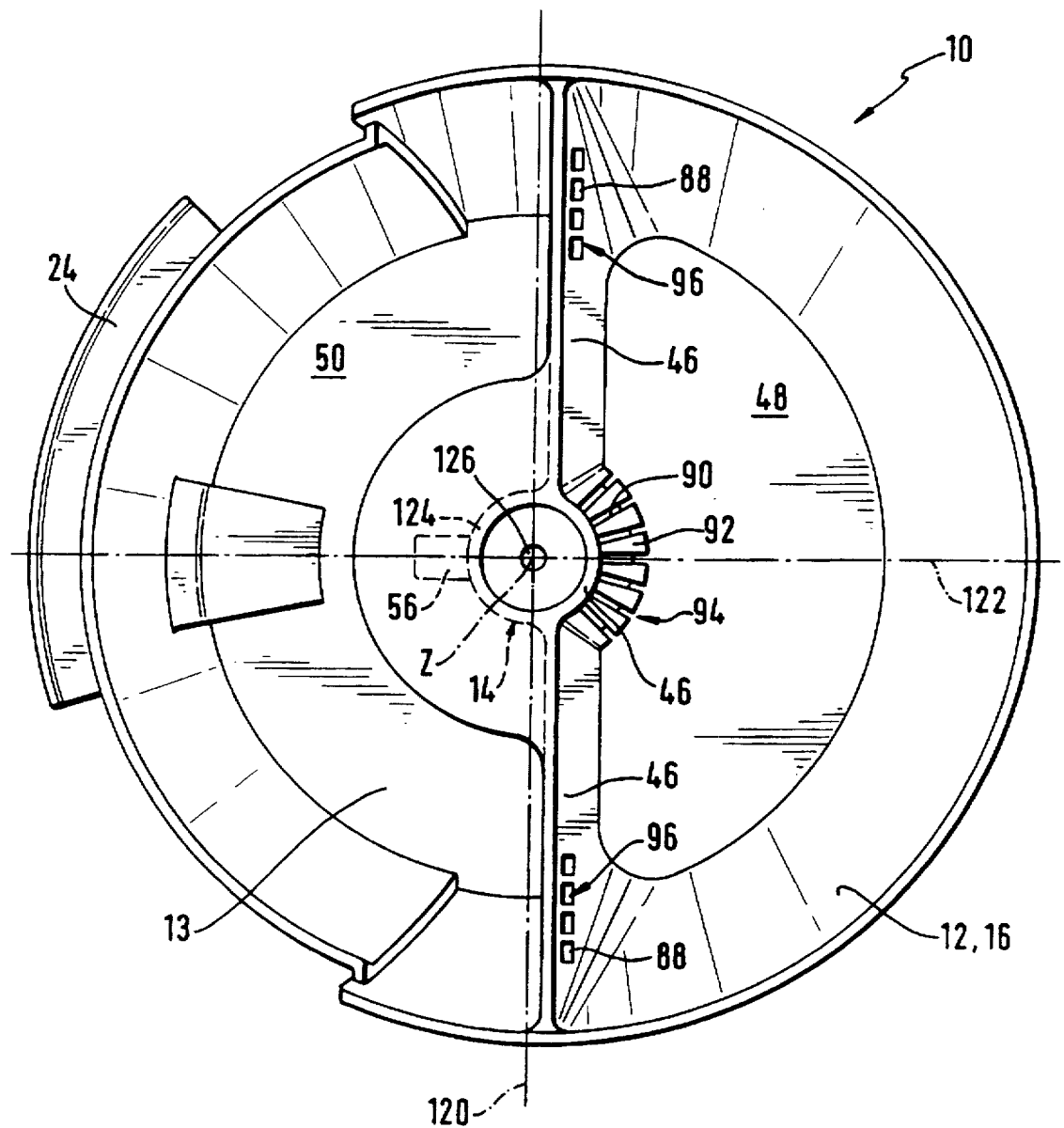
FIG. 2 is a top plan view of the tea filter assembly of FIG. 1.
Figure 3:
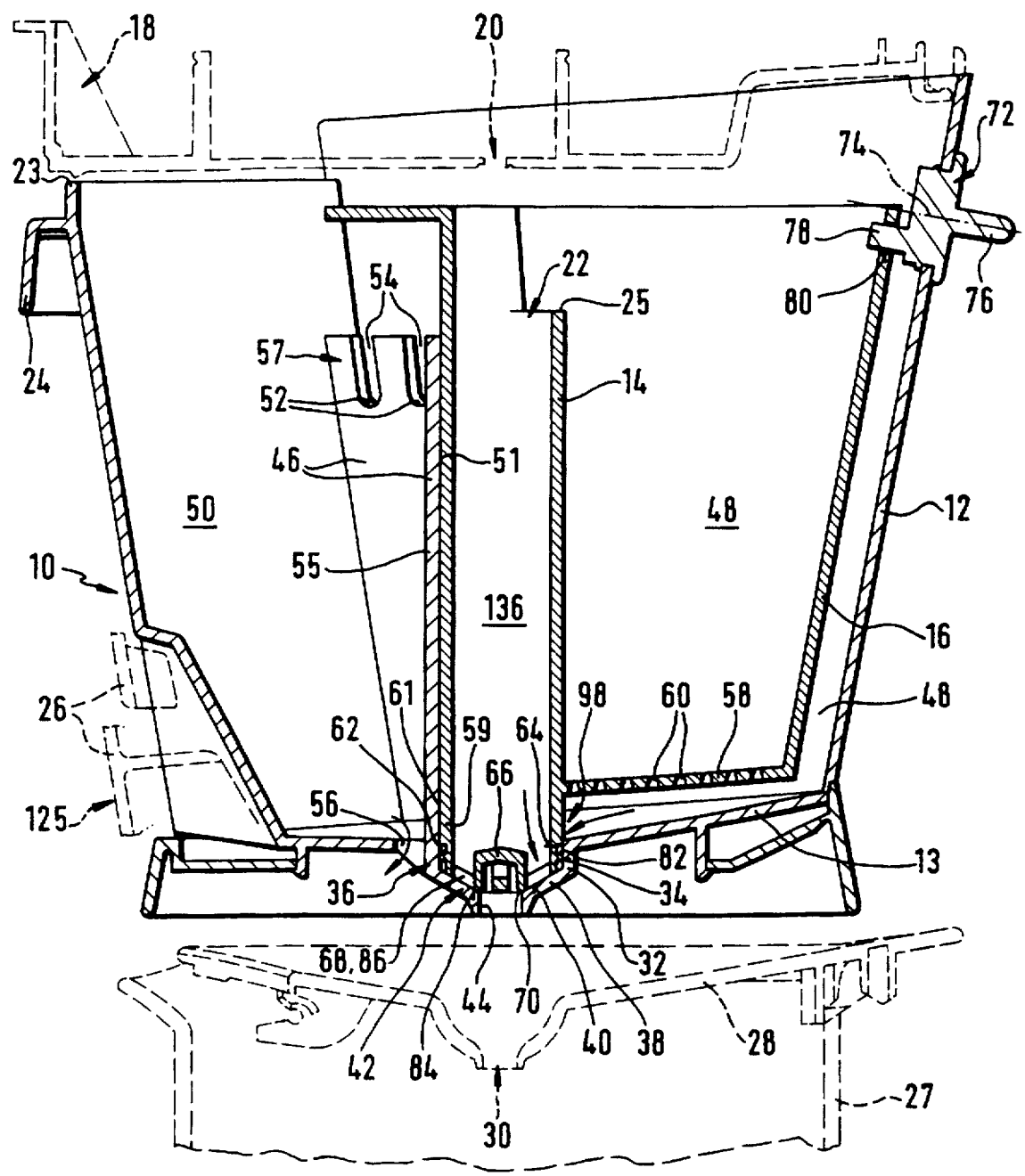
FIG. 3 is a partial longitudinal sectional view of a tea filter assembly illustrating a second embodiment of the present invention with a dual valve arrangement.

The tea filter assembly 10 of the invention as shown in FIGS. 1 to 5 is used for the making of tea with the aid of a conventional coffee maker of which only the brewing head 18 is indicated by dashed lines in FIGS. 1 and 3. The tea filter assembly 10 comprises a filter basket holder 12 in which a tea basket 16 integrally formed with a water conduit 14 is inserted. The parts 12, 14, 16 of the tea filter assembly 10 are preferably injection molded of plastic material.

Indicated by dashed lines in FIGS. 1 and 3 above the tea filter assembly 10 is part of the brewing head 18 of a coffee maker which is otherwise not presented in any further detail. A hot water discharge port 20 provided on the brewing head 18 is positioned to superpose the upper opening 22 of the water conduit 14. Water heated by a flow-through heater (not shown) flows out of the discharge port 20 into the tea filter assembly 10. The flow-through heater communicates with a water reservoir (not shown) of the coffee or tea maker.

The filter basket holder 12 may be designed to be hung in the coffee maker in place of a coffee filter; when used as a pure tea maker the coffee filter is then superfluous. For this purpose the tea filter assembly 10 has in a circumferential area of its upper brim 23 a depending, arcuate holding lug 24 for hanging in a complementary mount, not shown, of the coffee maker, which mount is otherwise used for hanging in a coffee filter (not shown).

In this embodiment, the filter basket holder 12 has the shape of a thin-walled truncated cone widening slightly toward the top. It is open at the top, and its lower end has a bottom 13. It will be appreciated that other shapes are of course also possible for the tea filter assembly 10. In the lower area, underneath the holding lug 24, the filter basket holder 12 rests against abutment stops 26, indicated by dashed lines in FIGS. 1 and 3, of the housing 125 (only intimated) of the coffee maker.

Underneath the tea filter assembly 10 according to FIGS. 1 and 3, a carafe 27 (partly shown by a dashed line) sits on a warming plate (not shown) of the coffee maker, the lid 28 of the carafe being indicated by dashed lines in FIGS. 1 and 3. The lid 28 is constructed as a shallow funnel with an inlet opening 30 at its center.

In FIGS. 1 and 2, the tea filter assembly 10 further comprises a filter housing 12 shaped essentially in the manner of a truncated cone, being divided at its center by a partition wall 46 so that to the right of the vertical center line 120 an infusion chamber 48 of essentially semicircular cross section is formed. It is also possible, however, for the infusion chamber 48 to be adapted for inserting in the filter basket holder 12 as an individual component. The upper edge of the partition wall 46 has on either side of the horizontal center line 122 (FIG. 2) one or several overflow edges 88 which according to FIG. 1 are adjoined in upward direction by a strainer 96. The strainer 96 is formed by slots extending to the overflow edge 88. The overflow edge 88 is provided on the infusion chamber 48 at a suitable level for the volume of the infusion chamber 48 to be large enough to enable tea leaves and sufficient hot water for the extraction process to be fed into the infusion chamber 48.

According to FIGS. 1 and 2, a water conduit 14 defined on the one side by the partition wall 46 and on the other side by an essentially semicircular wall 124 adjoining the partition wall extends at the center Z from the bottom 13 to a level above the overflow edge 88. The water conducting device 14 is thus comprised of a tube of circular cross section having its lower end closed by the bottom 13 and its upper end open by reason of the upper opening 22 to the hot water discharge port 20. Inside the conduit 14 there is an opening 126 in the bottom 13 which is adapted to be closed by a first valve 36. The first valve 36 is adapted to be actuated from the outside through an actuating bar 128 on which a manipulating handle 130 is formed. In this arrangement, the actuating bar 128 passes through a bore 134 provided in the foot 132 of the filter basket holder 12. At the junction between the bottom 13 and the water conduit 14 there is a fluid connection 90 in the form of a passageway opening exclusively into the infusion chamber 48. The fluid connection 90 has individual ribs 92, thus resulting in a strainer 94 for retaining the tea leaves.

The mode of operation of the tea filter assembly according to FIGS. 1 and 2 of the present invention is as follows:

After tea leaves are loaded in the infusion chamber 48 with the valve 36 in the closed position, the tea or coffee maker may be switched on. As soon as water is heated in the flow-through heater (not shown), the water is directed through a riser (not shown) to the hot water discharge port 20 from where it flows into the water conducting device 14. Because the first valve 36 is closed, the hot water rises in the water conduit 14, flowing through the fluid connection 90 into the infusion chamber 48 where it comes into contact with the tea leaves. The extraction process begins as the hot water extracts theine and other aromatic substances from the tea leaves. As long as hot water flows into the water conducting device 14, the water level rises uniformly in both the water conducting device 14 and the infusion chamber 48. Once the level reaches the overflow edge 88, the tea beverage flows over this edge into the overflow chamber 50 adjacent to the infusion chamber, thence through the drain 56 into the inlet opening 30 provided in the lid 28 and from there into the carafe 27 placed underneath.

Upon expiration of the required steeping time, an operator turns the actuating bar 128 by means of the manipulating handle 130, causing the first valve 36 to open. The liquid held in the water conducting device 14 and in the infusion chamber 48 now flows through the opening 126 and the open first valve 36 out through the outlet 44, entering the carafe 27 through the inlet opening 30. As this occurs, the tea beverage emanating from the fluid connection 90 of the infusion chamber 48 mixes with the hot water held inside the annular chamber 136. As long as hot water continues to flow from the hot water discharge port 20 into the upper opening 22 of the water conduit 14, this particular water no longer comes into contact with the tea leaves inside the infusion chamber 48 because it passes directly through the opening 126 to the outlet 44, albeit not until the tea beverage has been completely drained from the infusion chamber 48, and the hot water from the annular chamber 136. By virtue of this arrangement, any hot water still flowing after the first valve 36 was opened after a predetermined steeping time no longer comes into contact with the tea leaves, thus making it possible to limit further extraction and hence the amount of bitter principle in the tea beverage. By virtue of this arrangement it is thus possible for the taste, aroma and theine content to be determined by an operator during the infusion operation. Hence the invention is accomplished in the first embodiment with just a single valve 36, a water conducting device 14 and a fluid connection 90 provided at the bottom and extending from the water conducting device 14 to the infusion chamber 48.

Figure 4:
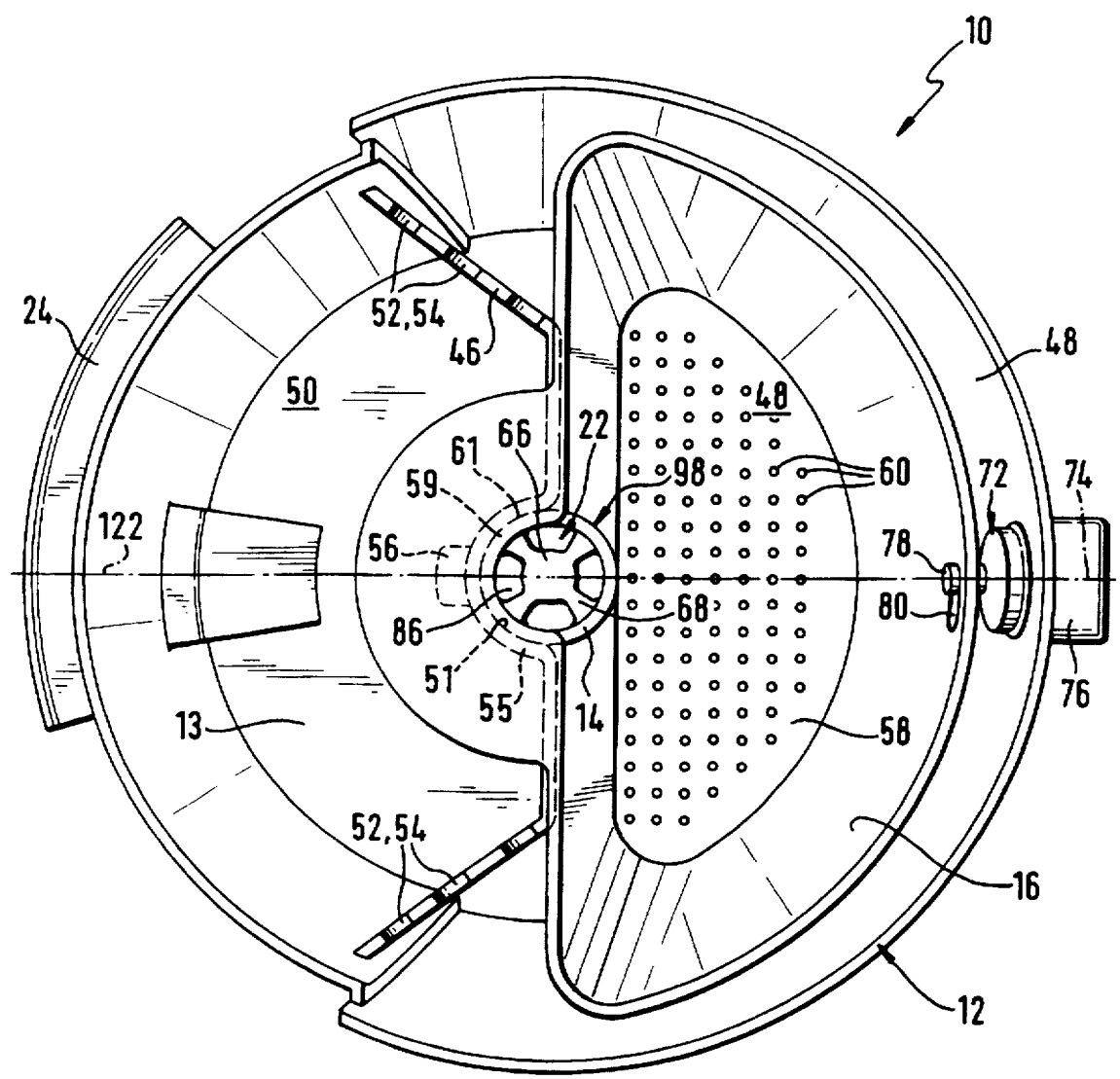
FIG. 4 is a top plan view of the tea filter assembly of FIG. 3.

FIGS. 3 and 4 illustrate a second embodiment of the invention, which is comprised essentially of a dual valve arrangement having two valves 36, 42 at the end of the water conducting device 14. At the center of the bottom 13 of the filter basket holder 12 according to FIGS. 3 and 4, there is a short downwardly extending hollow cylinder section 32 whose inner surface acts as a valve seat 34 for a valve 36. At its lower end the hollow cylinder section 32 merges into a hollow cone 38 whose conical inner surface forms a valve seat 40 for a further valve 42. Instead of a tip on the hollow cone 38, a passage bore is provided forming an outlet from the filter basket holder 12.

According to FIGS. 3 and 4, an essentially vertically extending partition wall 46 divides the interior of the filter basket holder 12 into an infusion chamber 48 in which the tea basket 16 is inserted, and an overflow area 50 which is provided adjacent to the infusion chamber 48 as a separate chamber in the tea filter assembly 10. The infusion chamber 48 occupies approximately half of the base area of the filter basket holder 12. The upper edge of the partition wall 46 forms on either side of the horizontally extending center axis 74 (FIG. 4) a strainer 57 for the infusion chamber 48. The strainer 57 has vertically extending slots 54 which form an overflow grill and whose lower edges form the overflow edges 52. The water conduit 14 has at its upper opening 22 a further overflow edge 25 lying at a level above the lower overflow edge 52 of the strainer 57.

Provided in the bottom 13 of the filter basket holder 12 is a drain 56 from the overflow area 50 near the center of the filter basket holder 12 directly against the partition wall 46. The drain superposes the lid 28, which acts as funnel, in the proximity of the inlet opening 30 of the lid 28.

According to FIGS. 3 and 4, the partition wall 46 has its center bent from above to below in a semicircular fashion over a section 55 in the direction of the overflow area 50. This semicircular section forms a guide surface 51 for the water conduit 14 and thus for the tea basket 16. The tea basket 16 inserted in the filter basket holder 12 has a semicircular base; it combines with the right-hand portion of the filter basket holder 12 to form the infusion chamber 48. Its bottom 58 is configured as a sieve having a plurality of passage holes 60. The water conduit 14 integrally formed with the tea basket 16 has in its lower section 59 equally a guide surface 61 which, extending in like direction, engages the guide surface 51 on the partition wall 46. The guide surface 61 is vertically displaceable together with the tea basket 16. The hollow cylinder section 32 in the bottom 13 of the filter basket holder 12 also serves as a guiding means for the lower end of the water conduit 14 and thus for the tea basket 16.

As mentioned in the foregoing, the tea basket 16 with the water conduit 14 is operable to be lowered and raised in the filter basket holder 12 as will be described in more detail in the following. FIG. 3 illustrates the tea basket 16 in its lowered position.

According to FIGS. 3 and 4, the lower end of the water conduit 14 is configured as a dual valve structure comprising a first 36 and a second valve 42. With the water conduit 14 in lowered position, the outer circumferential surface of the lower end of the water conduit 14 projects into the hollow cylinder section 32, thereby closing the outlet 44 at the bottom 13 of the filter basket holder 12, which outlet forms a drain for the tea basket 16 or the infusion chamber 48. To provide a seal, a sealing ring 62 is fitted in a circumferential sealing groove 64 in the outer surface at the lower end of the water conduit 14. With the water conduit 14 in the raised position, the outlet 44 is open for the passage of liquid from the infusion chamber 48 or the tea basket 16.

Arranged in the center of the lower end of the water conduit 14 according to FIGS. 3 and 4 is a cap 66 with its closed side facing up. This cap 66 forms the valve body of the second valve 42. It is integrally connected with the water conduit 14 via ribs 68. With the water conduit 14 in lowered position, its lower circumferential edge 70 engages sealingly the valve seat 40 of the second valve 42, thus preventing liquid from flowing out of the water conduit 14 through the outlet 44 at the bottom 13 of the filter basket holder 12. With the water conduit 14 in raised position, the outlet 44 for liquid from the water conduit 14 is open.

In the upper area, a lifting device 72 having an eccentric journal 78 is rotatably mounted in the filter basket holder 12 at a location on the circumference of the tea filter assembly 10 and the tea basket 16. The axis of rotation 74 of the eccentric journal 78 is slightly tilted relative to the horizontal. The lifting device 72 includes an actuating handle 76 projecting outwardly from the filter basket holder 12. The eccentric journal 78 engages in an essentially horizontal slot 80 in the tea basket 16. By turning the lifting device 72 one quarter turn it is possible to raise and lower the tea basket 16 together with the water guiding tube 14, whereby the two valves 36, 42 are jointly opened and closed.

Tea making by means of the tea filter assembly 10 according to the second embodiment of the invention as shown in FIGS. 3 and 4 is performed in conjunction with a conventional coffee maker 18 as follows:

Tea leaves or the like are loaded into the tea basket 16. The two valves 36, 42 are closed together with the water conduit 14 by lowering the tea basket 16 using the lifting device 72. After the coffee maker 18 is switched on, hot water flows out of the hot water discharge port 20 of the coffee maker 18 into the water conduit 14. Because the second valve 42 has closed the water conduit 14 at its lower end, the hot water accumulates in the water conduit 14 and, as soon as the annular chamber 136 is filled to capacity, flows over this chamber's top end into the infusion chamber 48 of the tea basket 16.

The tea leaves (not shown) held in the interior of the infusion chamber 48 are thus swirled about, resulting in better extraction of the tea leaves than with the first embodiment of FIGS. 1 and 2. Because the first valve 36 closes the outflow for liquid from the infusion chamber 48 while at the same time the second valve 42 closes the outlet 44, the hot water is unable to be drained, rising therefore in the infusion chamber 48 and in the annular chamber 136 simultaneously, producing a decoction.

To end the steeping operation upon expiration of a predetermined time period, an operator turns the eccentric device 72, thereby causing the tea basket 16 with the water conduit 14 to be raised. The two valves 36, 42 are opened. The decoction is drained from the infusion chamber 48 through the outlet 44 in the bottom 13 of the filter basket holder 12, entering the carafe 27 placed underneath the tea filter assembly 10. If any hot water continues to flow out of the discharge port 20 of the coffee maker 18, this water will flow directly through the water conduit 14, the open second valve 42 and the outlet 44 into the carafe 27, without this hot water coming into contact with the tea leaves inside the tea basket 16, thus enabling the taste of the tea to be determined by an operator independently of the amount of hot water.

If the level of liquid in the infusion chamber 48 rises above the overflow edge 52 of the partition wall 46 in the filter basket holder 12 while hot water is being delivered, the liquid will flow over this edge 52 into the overflow area 50 of the filter basket holder 12 and thence through the holder's drain 56 into the carafe. The slots 54 forming the retaining grill in the upper edge area of the partition wall 46 hold back any tea leaves floating on the liquid inside the infusion chamber 48, thus preventing them from entering the carafe.

FIG. 5 illustrates a third embodiment of a tea filter assembly 10 in which, as in FIGS. 3 and 4, the valve arrangement is a dual valve arrangement including a first and a second valve 36, 42, in which, however, the valve arrangement with its lifting device 72 is of a configuration different from that of the second embodiment of FIGS. 3 and 4. In this instance, the first and the second valve 36, 42 are comprised of a common sealing ring 110 of U-shaped cross section which is mounted in an annular groove 140 provided in the opening 138 of the outlet 44 The upward pointing sealing face serves to provide a seal for the sealing face 106 of the first valve 36 and for the sealing face 108 of the second valve 42. The first sealing face 106 is formed by the free end of the water conduit 14, while the second sealing face 108 is formed by a plug 102 provided in the lower end of the water conduit 14 and formed integrally with the water conduit 14 via cleats 144 (represented by dashes). Drain holes 104 are provided in the plug 102 between the cleats 144 and between the two sealing faces 106 and 108, thus establishing a fluid connection from the annular chamber 136 of the water conduit 14 to the second valve 42.

According to FIG. 5, the sealing ring 110 is centrally located within a holding ring 146, which is in turn guided on the guide surface 51. The holding ring 146 has depending hooks 148 latching behind the free end of the outlet 44 on the bottom 13 of the filter basket holder 12. In this arrangement, the holding ring 146 takes support upon a step 150 arranged at the outlet 44 and is thus fixed in this position. Radially beyond the hooks, the outlet bore 44 further has a stepped bore 152 which is engaged by a ring 154. Distributed around the circumference of the ring 154 are passageways 156, some of which are penetrated by the hooks 148. Further passageways 158 are provided on the ring 154 in offset position to the passageways 156 and are penetrated from below by hooks 160 resiliently engaging behind shoulders 162 provided on the passageway 158. In this manner, the dish-shaped actuating member 164, which is connected with a radially outwardly projecting lever 166, is thus joined to the ring 154 in a non-rotatable relationship thereto. The ring 154, however, together with the actuating member 164, is rotatably joined via the lever 166 to the free end of the outlet 44 of the filter basket holder 12 on the bottom 13. The actuating member 164 has a bore 168 extending concentrically with the opening 112 and forming the extension of the outlet 44.

According to FIG. 5, a journal 170 projects from the inner wall 169 of the ring 154 and engages in a slideway 116 provided in the extension 114. The slideway 116 extends upward on the circumferential edge of the extension 114 in such a way as indicated by the dashed line 172 that the extension 114 and hence the entire tea basket 16 are lifted upward when rotation is imparted to the ring 154 by means of the actuating member 164.

The mode of operation of the tea filter assembly 10 according to FIG. 5 of the invention is as follows:

When the two valves 36, 42 are closed and tea leaves have been loaded in the infusion chamber 48, the brewing operation can begin by hot water flowing through the hot water discharge port 20 into the water conduit 14 in accordance with FIG. 3. Once the annular chamber 136 is full up to the overflow edge 25, extracting water flows into the infusion chamber 48, extracting the tea leaves as previously described with reference to FIG. 3. If there is now to be no more contact between the hot water and the tea leaves, the lever 166 of the lifting device 118 configured in the form of a ramp arrangement is turned, thereby causing the ring 154 and hence the journal 170 to be turned via the actuating member 164. Because the tea basket 16 and hence the extension 114 are non-rotatably arranged in the filter basket holder 12, an axial displacement of the tea basket 16 in upward direction according to FIG. 5 results from the rotary movement. Hence the two sealing faces 106, 108 of the first and second valve 36, 42 become unseated from the sealing face 142 of the sealing ring 110, causing the decoction to be routed in the direction shown by the arrowed line 174 through the passage holes 60, along the bottom 13, past the first and second valve 36, 42, into the annular chamber 176 formed between the extension 114 and the inner wall 169, and thence to the outside through the bore formed by the inner wall 168. At the same time, the hot water held in the interior of the annular chamber 136 flows through the drain hole 104 and the second valve 42, entering equally the annular chamber 176. At the location between the first valve 36 and the drain hole 104, the decoction flowing out of the infusion chamber 48 mixes with the hot water inside the annular chamber 136 of the water conduit 14. If hot water now continues to flow through the hot water discharge port 20 into the annular chamber 136, this water will be fed to the outlet 44 without it coming into contact with the tea leaves in the infusion chamber 48. If hot water continues to be supplied to the water conduit 14 even as the decoction inside the infusion chamber 48 is being drained through the outlet 44, this hot water will now only flow out of outlet 44 into the carafe 27 (FIG. 3).

We claim:

1. A tea filter assembly, comprising:
   a conduit having an inlet end for receiving hot water from a brewer hot water discharge pot and an outlet end,
   an infusion chamber for brewing a beverage, said infusion chamber being in fluid communication with said conduit and including an outlet port for delivering a brewed beverage to a container,
   a valve assembly downstream from the infusion chamber for regulating fluid flow through said tea filter assembly, said valve assembly having a closed position and an open position, said closed position permitting fluid flow from said conduit to said infusion chamber while preventing fluid flow through said outlet end of said conduit, and said open position permitting fluid from said conduit to flow through said outlet end and permitting fluid from said infusion chamber to flow through said outlet port.

2. The tea filter assembly of claim 1 further comprising a fluid connection connecting said infusion chamber with said conduit to provide said fluid communication.

3. The tea filter assembly of claim 2 wherein said fluid connection is located upstream of said valve assembly.

4. The tea filter assembly of claim 3 wherein said fluid connection is located adjacent said outlet end of said conduit such that with said valve assembly in said second, open position, the brewed beverage flows from said infusion chamber through said outlet port into said conduit and through said outlet end of said conduit into the container.

5. The tea filter assembly of claim 2 wherein said fluid connection comprises a strainer.

6. The tea filter assembly of claim 2 wherein said infusion chamber includes an overflow device.

7. The tea filter assembly of claim 6 wherein said overflow device comprises a strainer.

8. The tea filter assembly of claim 2 further comprising a filter basket holder adapted to be fitted to a brewer and said water conduit and said infusion chamber are insertable into said filter basket holder.

9. The tea filter assembly of claim 8 wherein said water conduit and said infusion chamber are integrally formed and insertable together into said filter basket holder.

10. The tea filter assembly of claim 2 wherein said fluid connection comprises an overflow device located adjacent said inlet end of said conduit.

11. The tea filter assembly of claim 2 wherein said valve assembly comprises a first valve positioned to control flow of fluid out said outlet port and a second valve positioned to control flow of fluid out said outlet end.

12. The tea filter assembly of claim 11 further comprising a filter basket holder adapted to be fitted to a brewer, said water conduit and said infusion chamber being insertable into said filter basket holder, said filter basket holder defining an outlet of said tea filter assembly.

13. The tea filter assembly of claim 12 wherein said outlet of said tea filter assembly comprises a section of said second valve and said first and second valves are adapted to be actuated jointly.

14. The tea filter assembly of claim 13 further comprising a lifting device, actuation of said first and second valves being effected by raising and lowering said infusion chamber and said conduit relative to said tea basket holder.

15. The tea filter assembly of claim 14 wherein said lifting device is arranged between the filter basket holder and the infusion chamber.

16. The tea filter assembly of claim 13 wherein said second valve is arranged downstream from said first valve, fluid flowing from said infusion chamber and from said conduit both exiting said tea filter assembly through said tea filter assembly outlet.

17. The tea filter assembly of claim 11 wherein a lower end of the conduit is configured as a dual valve structure comprising a section of said first valve and a section of said second valve, said first and second valves extending concentrically with each other.

18. The tea filter assembly of claim 17 wherein said dual valve structure is formed with first and second sealing seats arranged in succession and cooperating with corresponding first and second sealing faces in the outlet of said tea filter assembly, said first sealing seat cooperating with said first sealing face to form said first valve, and said second sealing seat cooperating with said second sealing face to form said second valve.

19. The tea filter assembly of claim 18 wherein said tea basket holder includes a hollow cylinder section into which the outlet end of the conduit extends, an inner wall of said hollow cylinder section forms said first sealing face.

20. The tea filter assembly of claim 19 further comprising a cap located at the outlet end of the conduit, said cap having lateral openings allowing the passage of fluid to said second valve, a surface of said cap defining said second sealing seat.

21. The tea filter assembly of claim 20 further comprising a hollow cone adjoined with said hollow cylinder section, a surface of said hollow cone defining said second sealing face.

22. The tea filter assembly of claim 12 further comprising a plug located at the outlet end of said conduit, said plug and an inner wall of said conduit defining drain holes therebetween which separate said first valve from said second valve.

23. The tea filter assembly of claim 22 further comprising a common seal structure secured in the filter basket holder outlet, said first and second valves each having a sealing face cooperating with said common seal structure.

24. The tea filter assembly of claim 23 wherein said seal structure includes an opening forming said filter basket holder outlet and being penetrated by an extension formed on said plug, said tea filter assembly further comprising a lifting device provided on said extension and adapted to control said first and second valves.

25. The tea filter assembly of claim 8 wherein said filter basket defines an inner space and said infusion chamber occupies about 20% to 60% of said inner space.

26. The tea filter assembly of claim 25 wherein said ion chamber occupies about 50% of said inner space.

* * * * *